June 8, 1954    H. C. BRILL    2,680,645
AUTOMOBILE BODY PILLAR AND DOOR
Filed Aug. 18, 1950
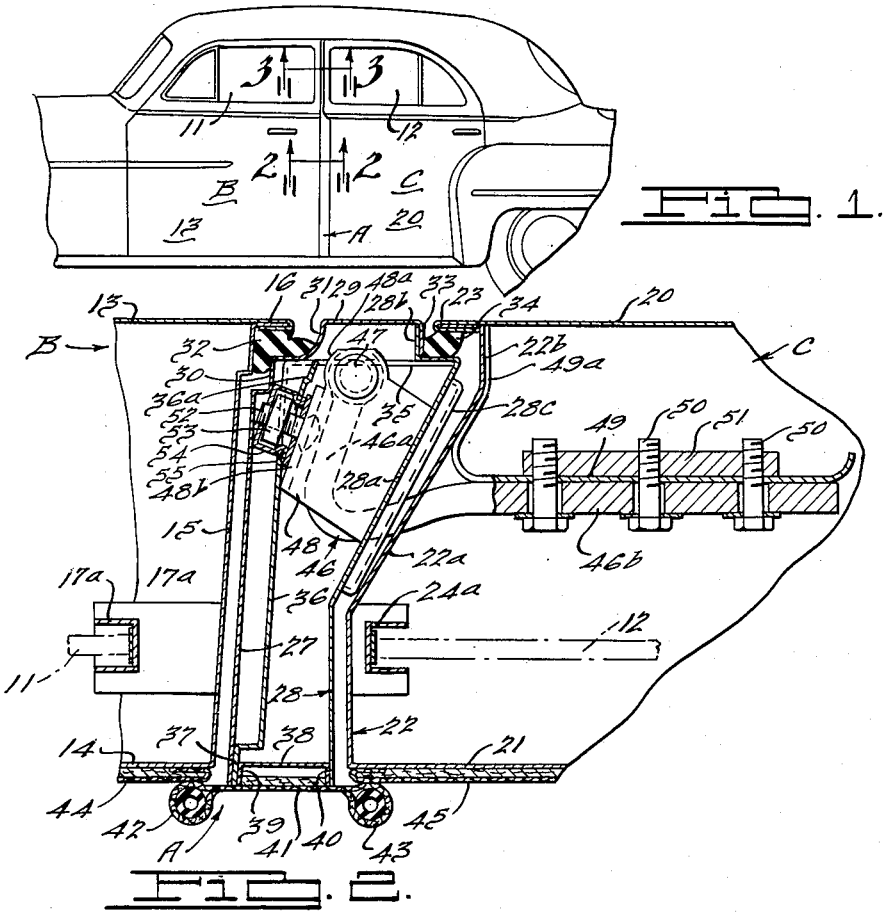
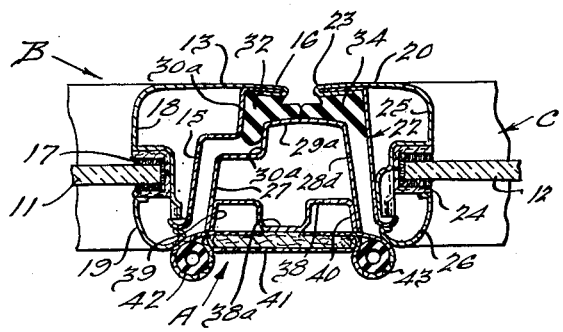
INVENTOR.
Herbert C. Brill.
BY
Elmer Jamison Gray
ATTORNEY.

Patented June 8, 1954

2,680,645

UNITED STATES PATENT OFFICE 2,680,645

AUTOMOBILE BODY PILLAR AND DOOR

Herbert C. Brill, Detroit, Mich., assignor to Briggs Manufacturing Company, Detroit, Mich., a corporation of Michigan Application August 18, 1950, Serial No. 180,231

11 Claims. (Cl. 296—28)

This invention relates to a vehicle body and in particular to an improved construction in a body pillar having a door hinged thereto, the invention being especialy but not necessarily exclusively applicable in the construction of the central or intermediate body pillar of the sedan type passenger automobile.

In a customary automobile body construction, a body pillar of generally box-like section is provided having a door hinged thereto. An important objection to such a construction is that the sectional thickness between the front and rear walls of the pillar, particularly of the intermediate or central pillar, gives the same an objectionable bulky appearance and comprises a serious obstruction to vision.

An object of the present invention is to provide an improved vehicle body pillar having inner and outer portions of materially different cross sectional thickness from front to rear and a door hinged to the portion of greater thickness. In a preferred construction, the door is provided with a window opening in its upper portion and the aforesaid inner and outer pillar portions of different sectional thickness extend below the window, the sectional area of the upper portion of the pillar in the region of the window being approximately the same as the thinner pillar portion below the window. Also in a preferred construction, the edge of the door adjacent the inner and outer pillar portions also comprises inner and outer portions offset from each other from front to rear so as to interfit with the pillar when the door is closed.

Other objects of the present invention are to provide an improved central or intermediate body pillar embodying a rear door hinge mounting, which permits an appreciably narrower front-to-rear pillar thickness than has been feasible heretofore in comparable pillars; and in particular to provide an improved vehicle body construction comprising a central or intermediate pillar and a rear door having a window in its upper portion, the pillar below the window having an outer portion within which the door is hinged and an inner portion of appreciably smaller thickness from front to rear than the outer portion, in addition the sectional thickness of the pillar in the region of the window being appreciably less either longitudinally or transversely of the body than the corresponding thickness of said outer pillar portion. In this construction the forward edge of the door is preferably provided with an inner portion offset forward and inside of the outer thicker portion of the pillar when the door is closed so as to conceal the hinges without recourse to any portion of the door telescoping or extending inside of the inner surface of the pillar. The forward edge of the window is preferably offset forward of the outer portion of the door, effectively increasing vision particularly to the side and rear for the driver and front seat passenger. By virtue of the reduced front-to-rear thickness of the inner portions of the intermediate pillar, a much less bulky and heavy appearance is afforded thereto as seen from the inside of the body and greater window area for both the front and rear doors is permitted.

Other objects of this invention will appear in the following description and appended claims, reference being had to the accompanying drawings forming a part of this specification wherein like reference characters designate corresponding parts in the several views.

Fig. 1 is a fragmentary side view of an automobile body constructed in accordance with the present invention.

Fig. 2 is a fragmentary enlarged horizontal cross-section taken in the direction of the arrows substantially along the line 2—2 of Fig. 1, showing the upper hinge mounting.

Fig. 3 is a fragmentary enlarged horizontal cross-section taken in the direction of the arrows substantially along the line 3—3 of Fig. 1.

It is to be understood that the present invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular application of the present invention is illustrated by way of example in the construction of a sedan type automobile having an intermediate body pillar A which provides front and rear jamb faces for front and rear doors B and C respectively. The doors are provided with windows in their upper portions closed respectively by vertically sliding glass panels 11 and 12.

The front door B comprises in the present instance spaced outer and inner pressed metal panels 13 and 14, the latter having a rear edge portion 15 which extends outward and is suitably joined with the rear edge of the panel 13 at a triple thickness overlap flange 16. The front edge of the door B is suitably hinged to the vehicle front pillar by means not shown which may if desired embody the teachings of the present invention discussed below, so as to swing outward or close against the forward jamb face of the pillar A.

The glass panel 11 for the front door B is supported along its front and rear edges within the usual glass-run channels, as for example the channel 17, Fig. 3, which is suitably supported by an inbent flange 18 of the door panel 13. The flange 18 comprises the outer portions of the front window frame and cooperates with the portion of the rear edge 15 in the region of the window to complete a rear upright frame element of box-like section for said front window frame. A garnish molding 19 trims the inner portion of the rear upright frame element.

The glass-run channel 17 extends downward at 17a below the level of the window to receive and guide the rearward edge of the glass panel 11 when the same is lowered to open the window and is suitably secured to the door edge 15 near the inside panel 14. As indicated by comparing Figs. 2 and 3, the lateral width of the door B below the window is considerably greater than the corresponding width in the region of the window and the glass-run channel 17, 17a extends closer to the inner portion of the door in the thicker region thereof below the window.

The door C is similarly constructed, comprising outer and inner pressed metal panels 20 and 21, the latter having a forward edge portion 22 extending outward and is suitably joined with the forward edge of the panel 20 at a triple thickness overlap flange 23. The upper portion of the rear door C in the region of its window, as in the case of the front door B, is appreciably narrower laterally than the portion below the window. Also as indicated in Fig. 2, the forward edge 22 below the window comprises inner and outer portions, the former extending generally perpendicularly outward from the panel 21 a distance corresponding approximately to the door width in the window region, then extends angularly rearward and outward at 22a, then directly outward again at 22b to the rearward edge of the flange 23. Thus the inner portion of the forward edge of the rear door below the window is offset forward of the corresponding outer portion.

The glass panel 12 for the rear door is also suitably supported along its front and rear edges within glass-run channels, as for example the channel 24, Fig. 3, suitably supported by an inbent flange 25 of the outer door panel 20. The flange 25 comprises the outer portion of the frame for the rear door window and cooperates with the portion of the forward edge 22 above the window to complete a forward upright frame element of box-like section for said front window frame. A garnish molding 26 trims the inner portion of the forward upright frame element. Below the window, the glass-run channel 24 extends downward at 24a along the forwardly offset inner portion of the door edge 22 and is suitably secured thereto to guide the forward edge of the glass panel 12 when the same is lowered to open the window.

Spacing the doors B and C and providing forward and rearward jambs for the door edges 15 and 22 respectively is the intermediate body pillar A as aforesaid, suitably joined as by welding above and below to the usual upper and lower body sills. In the present instance, the pillar comprises a generally channel-shaped inward opening sheet metal structure having forward and rearward walls 27 and 28 comprising the jambs for the corresponding door edges 15 and 22.

As in the case of the doors B and C, the sectional area of the upper portion of the pillar A in the region of the door windows is appreciably less than the lower portion of the pillar A below the windows. In the latter portion, the outer wall 29 of the pillar channel is generally flush with the door panels 13 and 20. The outer forward portions of the pillar A below the windows are rabbeted at 30 and 31 to receive the usual compressible sealing strip 32 which is bonded in place for engagement by the overlap flange 16. The outer rearward portion of the pillar A below the window is similarly rabbeted at 33 to receive the compressible sealing strip 34 which is bonded in place for engagement by the overlap flange 23.

Extending vertically within the pillar below the windows is a reinforcement or hinge bracket of generally L-section having a short outer leg 35 lying across the inner edges of the rabbeted portions 31 and 33 and welded thereto and also having a longer leg 36 extending generally parallel to the wall 27 and spaced therefrom. The inner edge of the leg 36 is offset forward at a flange 37 welded to the inner edge portion of the wall 27 near the mouth of the pillar channel. The latter is closed by a shallow inward opening vertical channel closure member 38 having front and rear edges 39 and 40 welded to the inner edge portions of the flange 37 and wall 28 respectively. The channel member 38 is concealed by the usual trim panel element 41 which in the present instance carries front and rear yieldable windlace members 42 and 43 adapted to be engaged by the adjacent edges of the doors when closed so as to close the gaps at the inside of the vehicle body between the pillar jambs 27 and 28 and the corresponding rear and front edges 15 and 22 of the doors B and C respectively. Mounted upon the inner metal door panels 14 and 21 are conventional trim panels 44 and 45 respectively.

For the purpose of providing a hinge mounting for the rear door C, the thickness of the outer portion of the pillar A below the windows is appreciably greater from front to rear than the corresponding thickness of the inner portion of the pillar, which latter is as thin as practicable without sacrificing the required strength and rigidity. To this end, the rear pillar wall 28 extends directly outward generally parallel to the inner portion of the door edge 22 to an extent approximately equal to the transverse thickness of the upper door portion in the region of the window, then rearward and outward at 28a generally in parallelism with the edge portion 22a. In the present instance the pillar portions 27 and 28 below the door windows are formed separately, so that the outer pillar wall portion 28a terminates in a forward extending flange comprising the inner edge of the rabbeted portion 33. The latter in turn terminates in an outward flange 28b welded to and overlapped by the inbent flange of the wall 29 which comprises the forward edge of the rabbeted portion 33.

Preferably a pair of vertically spaced hinges are employed to mount the door C on the pillar A for swinging outward or for closing against a rear body pillar in accordance with usual practice. Inasmuch as each hinge mounting is substantially like the other, details of the upper hinge mounting only are illustrated herein. In the present instance a goose-neck type hinge 46 is shown having the forward outer end of its curved portion hinged on a vertical pin 47 which extends through and is supported above and below the hinge 46 within paired vertically spaced horizontal bracket plates of a channel-like hinge mounting 48. The latter is rigidly mounted within the outer larger portion of the pillar A so as to support the pin 47 near the outer pillar wall 29 and intermediate the rabbeted portions 31 and 33, the outer portions of the horizontal bracket plates within which the pin 47 is mounted being projected at 48a through a vertical opening in the outer leg 35 of the L-section reinforcing bracket.

When the door C and hinge 46 are in the closed position, the curved forward portion of the latter extends angularly forward and inward at 46a, then curves sharply and extends as a rearward hinge arm 46b through a hinge opening provided in an embossed reinforced portion 28c of the pillar rear wall outer portion 28a. By virtue of the forward and inward extension 46a, a wide angle of outward swinging of the hinge 46 is permitted with a hinge opening of minimum size in the embossment 28c. The hinge arm portion 46b extends generally parallel to the door panel 20 and is suitably secured to a hinge bracket 49 by means of a plurality of screws 50 passing through the arm 46b and bracket 49 and screwing into a tapping plate 51. Forward of the plate 51, the bracket 49 curves outward at 49a so as to conform to the door edge portions 22a and 22b to which it is welded.

In order to permit the desired forward extension of the hinge portion 46a within a pillar section of minimum front-to-rear thickness, the horizontal plates of the hinge mounting 48 are joined by an integral base portion 48b which extends vertically in a plane generally parallel to and immediately forward of the hinge portion 46a when the latter is in the closed position. Also the outer portion of the leg 36 of the L-section reinforcing bracket is embossed rearward to providet a portion 36a immediately forward and parallel to the base 48b, to which the latter is rigidly secured as by a plurality of screws 52. Each screw 52 extends forward perpendicularly through the base 48b into a floating nut 53 retained forward of the embossment 36a within a cage 54. The latter is provided with rearward prongs 55 which extend through an opening in the embossment 36a and are clinched around the edges thereof as indicated in Fig. 2. Although the section of Fig. 2 is taken principally below the upper hinge so as to show the bottom thereof, a portion of the section has been taken through the embossment 36a and nut and cage assembly 53, 54, as well as through the rearward portion of the hinge arm 46b, to clarify details of these elements in the drawings.

By the foregoing assembly including the hinge mounting base 48b, embossment 36a, and floating nut and cage assembly 53, 54 disposed obliquely with respect to the longitudinal axis of the automobile body, the front-to-rear thickness of the pillar A is materially decreased without in any way impairing the extent of desired opening movement of the door C. In particular, the obliquely disposed screw 52 and cage assembly 54 permits an appreciable reduction in the spacing between the bracket leg 36 and forward pillar wall 27, as compared to comparable structures employed heretofore.

It is to be observed by comparing Figs. 2 and 3 that the cross sectional area of the pillar A in the region of the windows corresponds approximately to the sectional area of the inner portion of the pillar below the windows and inward of the inner edge of the rearwardly offset or angular extension 28a. Thus below the windows the outer portion of the jamb 28 for the rear door C is offset rearward from the corresponding inner portion and the forward edge 22 of the rear door is correspondingly offset so as to interfit with the pillar when the door C is closed. The hinge structures are thereby concealed and a much less bulky appearing pillar is seen from the inside of the body.

In the region of the windows, the outer pillar wall extends at 29a inward of the door overlap flanges 16, 23, thereby eliminating the rabbeted portion 33 and reducing the rabbeted portions 30, 31 to a single rabbeted portion 30a. The rear pillar wall 28 in the region of the windows comprises an inward extension 28d of the pillar outer wall 29a and is welded to the rear wall or flange 40 of the closure channel 38. To effect additional reinforcement, the latter is embossed inward at 38a in the region of the windows to compensate for the reduction of the pillar material at said region.

By virtue of the present structure, the forward edge of the rear door window and panel 12 is located appreciably forward of the rear edge of the outer portion of the pillar A, and also forward of the outer portion of the door C. Thus in addition to other advantages, greater window area is made feasible for both the front and rear doors, materially increasing vision, particularly to the side and rear for the driver and front seat passenger.

I claim:

1. In a vehicle body, an intermediate body pillar having a rear face comprising a jamb for a rear door, a rear door hingedly connected to said pillar and having a window in its upper portion, said jamb and juxtaposed portion of the closed door below the window being offset laterally outward and rearward of the upper portion of said jamb at the window level.

2. In a vehicle body, an intermediate body pillar having a rear face comprising a jamb for a rear door, a rear door having a window in its upper portion, said jamb and the forward edge of the door in the closed position being juxtaposed and having outer portions below the window level offset laterally outward and rearward of the upper portion of said jamb at the window level, and means hingedly connecting the door to the lower outer portion of the pillar.

3. In a vehicle body, an upright body pillar having a door jamb at one face thereof, a door hinged to said pillar and having a window in its upper portion, said pillar below said window having an enlarged outer portion within which the door is hinged and an inner portion, the outer portion having a cross sectional area greater than the cross sectional area of either the inner portion or of the pillar at the window level, and said outer portion extending in the direction faced by said jamb beyond the edge of the window adjacent the jamb when the door is closed.

4. In a vehicle body, an upright body pillar having a door jamb at one face thereof, a door hinged to said pillar and having a window in its upper portion, said pillar below said window having an enlarged outer portion within which the door is hinged and of greater cross sectional area than that of the pillar at the window level, and said outer portion extending in the direction faced by said jamb beyond the edge of the window adjacent the jamb when the door is closed.

5. In a vehicle body, a body pillar having lower outer and inner portions, the outer portion having a greater cross sectional thickness longitudinally of the body than the inner portion, a door hingedly connected to said pillar at the outer portion of greater thickness, the face of the inner portion of the pillar adjacent the door being offset longitudinally of the body in a direction away from the door and the adjacent portions of the door being correspondingly offset to interfit with the pillar when the door is closed, and a window in said door above said lower portions and within the offset portion of the door adjacent the inner pillar portion of smaller thickness, the upper portion of the pillar above said lower portions having a smaller cross sectional thickness transversely of the body than said lower outer portion.

6. In a vehicle body, an intermediate body pillar, a door hinged to said pillar and having a window in the upper portion thereof, said pillar below said window having an outer portion within which the door is hinged and an inner portion, the cross sectional thickness longitudinally of the body of the outer portion being materially greater than the cross sectional thickness longitudinally of the body of the inner portion, said window having its forward edge adjacent the pillar disposed forwardly of the rear outer edge of the thicker outer portion of the pillar when the door is closed.

7. In a vehicle body, an intermediate body pillar, a door hinged to said pillar and having a window in the upper portion thereof, said pillar below the window having an outer portion and an inner portion, the cross sectional thickness longitudinally of the body of the outer portion being materially greater than the cross sectional thickness longitudinally of the body of the inner portion, the rear wall of the pillar comprising a jamb for the door, said jamb and the adjacent portion of the door having forwardly offset inner portions, and said window having its forward edge adapted to travel up and down in said forwardly offset inner portion of the door.

8. In a vehicle body, an intermediate body pillar, a door hinged to said pillar and having a window in the upper portion thereof, said pillar below the window having an outer portion and an inner portion, the cross sectional thickness longitudinally of the body of the outer portion being materially greater than the cross sectional thickness longitudinally of the body of the inner portion, said window having its forward edge movable up and down in a path disposed opposite said inner portion and forwardly of the outer rear edge of said outer portion.

9. In a vehicle body, an intermediate body pillar, a rear door hinged to said pillar having a window in the upper portion thereof, said pillar below said window having an outer portion within which the door is hinged and an inner portion, the cross sectional thickness of the outer portion being materially greater than the cross sectional thickness of the inner portion, the forward edge of the window adjacent the pillar being forward of the rear outer edge of the thicker portion of the pillar when the door is closed, and the thickness of the pillar section at the locality of the window being materially less than the thickness of said outer portion.

10. In a vehicle body, an intermediate body pillar of box-like section having a rear wall comprising a jamb for a rear door, a hinge mounting within said pillar having an upright bracket portion rigidly secured within the pillar near the outer and forward walls thereof at an angle directed rearward and laterally outward, a hinge member pivotally mounted on said mounting and having a hinge arm extending generally rearward through an opening in said jamb, a rear door secured to said hinge arm for swinging therewith, said jamb and the adjacent portion of the closed door having interfitting forwardly offset inner portions, and a window in said door having its forward edge in the forwardly offset inner portion of the door.

11. In a vehicle body, an intermediate body pillar, a door hinged to said pillar and having a window in the upper portion thereof, said pillar below said window having an outer portion within which the door is hinged and an inner portion, the cross sectional thickness longitudinally of the body of the outer portion being materially greater than the cross sectional thickness longitudinally of the body of the inner portion, said outer and inner portions of the pillar adjacent the door and below said window opening being offset from each other longitudinally of the body and the adjacent portions of the door being correspondingly offset to interfit with the pillar when the door is closed, the forward edge of the window when lowered being disposed within the offset portion of the door opposite the pillar portion of smaller thickness.

References Cited in the file of this patent

UNITED STATES PATENTS

| Number | Name | Date |
|---|---|---|
| Re. 19,416 | McCormick | Jan. 8, 1935 |
| 1,622,098 | Emond | Mar. 22, 1927 |
| 2,121,790 | Etzel | June 28, 1938 |
| 2,314,337 | Gessler | Mar. 23, 1943 |
| 2,326,789 | Marine | Aug. 17, 1943 |
| 2,342,531 | Dean | Feb. 22, 1944 |
| 2,532,203 | Stephenson et al. | Nov. 28, 1950 |